(12) United States Patent
Matthijsse et al.

(10) Patent No.: US 7,151,249 B2
(45) Date of Patent: Dec. 19, 2006

(54) METHOD FOR DETERMINING THE CUT-OFF WAVELENGTH OF AN OPTICAL FIBRE AS WELL AS A DEVICE SUITABLE FOR THAT PURPOSE

(75) Inventors: Pieter Matthijsse, Hapert (NL); Koen De Jongh, Son en Breugel (NL); Gerardus Franciscus Cleven, Valkenswaard (NL)

(73) Assignee: Draka Fibre Technology B.V., Eindhoven (NL)

( * ) Notice: Subject to any disclaimer, the term of this patent is extended or adjusted under 35 U.S.C. 154(b) by 221 days.

(21) Appl. No.: 10/886,618

(22) Filed: Jul. 9, 2004

(65) Prior Publication Data

US 2005/0035279 A1    Feb. 17, 2005

(30) Foreign Application Priority Data

Jul. 11, 2003    (NL) ................................... 1023909

(51) Int. Cl.
*G01J 1/24* (2006.01)
(52) U.S. Cl. ............................ 250/227.16; 250/227.18
(58) Field of Classification Search ........... 250/227.16, 250/227.14, 227.18, 227.23
See application file for complete search history.

(56) References Cited

U.S. PATENT DOCUMENTS 4,714,343 A * 12/1987 Ide ........................... 356/73.1
5,130,535 A    7/1992 Kummer et al.
5,329,607 A * 7/1994 Kamikawa et al. ......... 385/123

FOREIGN PATENT DOCUMENTS

EP    0 172 328    2/1986

OTHER PUBLICATIONS

C. Unger, et al., "Characterization of the bending sensitivity of fibers by the MAC-value", Optics Communications, vol. 107, No. 5/6, XP-000955364, May 1, 1994, pp. 361-364.

* cited by examiner

*Primary Examiner*—Que T. Le
(74) *Attorney, Agent, or Firm*—Oblon, Spivak, McClelland, Maier & Neustadt, P.C.

(57) ABSTRACT

The present invention relates to a method and a device for determining the cut-off wavelength of an optical fiber. A first aspect of the present invention is to provide a method for determining the cut-off wavelength of an optical fiber, which method provides a stable measurement, which measurement is substantially independent of the exact fiber position.

8 Claims, No Drawings

METHOD FOR DETERMINING THE CUT-OFF WAVELENGTH OF AN OPTICAL FIBRE AS WELL AS A DEVICE SUITABLE FOR THAT PURPOSE

BACKGROUND OF THE INVENTION

1. Field of the Invention

The present invention relates to a method for determining the cut-off wavelength of an optical fibre. The present invention furthermore relates to a device for carrying out such a method.

2. Description of the Related Art

European patent application No. 0 172 328 relates to a standard method and equipment for measuring the cut-off wavelength in optical fibres, wherein a spectral scanning is effected, in particular under three different perturbation conditions. Such spectral scanning is in particular carried out at a plurality of different wavelengths with differently bent fibre positions, as is shown in FIG. 3 of the aforesaid European application.

In the article "Characterization of the bending sensitivity of fibers by the MAC-value", Unger C., et al., Optics Communications, 107 (1994), 361–364, Elsevier, it is indicated that the MAC-value, viz. the ratio between the mode field diameter and the cut-off wavelength, is a measure for characterizing the bending sensitivity of so-called step index fibres.

From U.S. Pat. No. 5,130,535 there is known a method and apparatus for determining the bend loss along a length of optical fibre, wherein the backscattering power is measured as a function of distance along the fibre in one direction along the length of fibre by launching light energy into one end of the fibre, after which the same measurement is carried out at the other end of the optical fibre. Subsequently, a mathematical calculation is carried out on the two signals to provide a quantity which is related to mode field diameter, wherein variations in the quantity are stated to be indicative of the variations in the bend loss along the length of fibre.

From U.S. Pat. No. 6,456,370 there is known a method for measuring the cut-off wavelength of an optical fibre with an optical time domain reflectometer (OTDR) or backscattering apparatus, which method is based on the measurement of the splice loss between the fibre before bending and the optical fibre under test. More detailed information with regard to the relation between said splice loss and the cut-off wavelength is not provided. Furthermore, said US patent employs two OTDR splice loss measurements, which are always carried out in one and the same direction. Moreover, no further information is provided as regards the device that is used for introducing bends into the optical fibre.

Various characteristics of the glass fibre play an important part in the design of optical telecommunications systems comprising glass fibres. Thus, the distance to be bridged is to a large extent determined by the attenuation of the glass fibre and the dispersion characteristics. In addition to that, also the mode field diameter and the cut-off wavelength are of importance for single mode fibres. The mode field diameter is a measure of the cross-section of the optical signal in the glass fibre. For a network consisting of a chain of several fibre routes, single mode fibres having the same mode field diameter should be selected as much as possible, since otherwise the attenuation losses that occur at the connections between the various fibres will become too great.

The cut-off wavelength is a measure of the wavelength above which the glass fibre is in the single mode region. A proper guidance in the fibre can only take place for one mode, the fundamental mode, which is the basis for the very good bandwidth characteristics of the fibre. In the case of wavelengths lower than the cut-off wavelength, optical guidance through the fibre is also possible for other modes, "higher-order modes". However, the fact that said modes have different propagation velocities leads to "multimode" behaviour, with greater signal distortion, as a result of which the desired communication characteristics cannot be obtained.

Consequently, it is of great importance for the production and the delivery of single mode glass fibre cables to ensure for every fibre that the cut-off wavelength is lower than an indicated maximum value. If the value becomes too low, however, negatives side effects are observed, such as undue attenuation of the fundamental mode in the case of light bending of the fibre, which bending especially takes place upon cabling in practice. As a result of all this, the measurement of the cut-off wavelength is an important item in the production of glass fibres intended for the glass fibre cable industry. Central elements in the internationally standardised measuring method that is used for that purpose are the fact that a spectral measurement is carried out at a series of wavelengths around the cut-off wavelength, and that the fibre has a standardised, bent position that simulates the situation in a standardised cable. The above two elements make the measurements relatively time-consuming and sensitive to the correct position of the fibre, as a result of which the measurement is furthermore slightly inaccurate in production situations. In addition, relatively costly equipment which can only be used for this purpose is required.

SUMMARY OF THE INVENTION

A first aspect of the present invention is to provide a method for determining the cut-off wavelength of an optical fibre, which method provides a stable measurement, which measurement is substantially independent of the exact fibre position.

Another aspect of the present invention is to provide a method for determining the cut-off wavelength of the optical fibre, which method enables a quick measurement, using an easily reproducible bend of the optical fibre.

Yet another aspect of the present invention is to provide a device for determining the cut-off wavelength of the optical fibre, wherein use is made of a bending device that introduces a stable and reproducible bend into the fibre.

According to the present invention, the method for determining the cut-off wavelength of an optical fibre is characterized in that the method comprises the following steps:

i) providing a spectral measurement setup, ii) carrying out a spectral measurement on the optical fibre, using the spectral measurement setup at a specific wavelength, iii) introducing a bend into the optical fibre, iv) carrying out a spectral measurement on the optical fibre comprising said bend, using the spectral measurement setup, at a specific wavelength, v) determining the bend attenuation on the basis of the measuring results obtained in steps ii) and iv), vi) relating the cut-off wavelength to the bend attenuation and the mode field diameter by correlating the cut-off wavelength of the optical fibre to the bend attenuation and the mode field diameter of the optical fibre on the basis of a previously determined mutual correlation.

The previously determined correlation as referred to in step vi) in particular comprises a number of substeps vii)–xi), viz.:

vii) determining the mode field diameter of the optical fibre, viii) measuring the attenuation of the optical fibre at said specific wavelength, ix) introducing a bend into the optical fibre and measuring the attenuation at said specific wavelength, x) determining the cut-off wavelength by carrying out a spectral attenuation measurement at a number of wavelengths around the cut-off wavelength, in which the optical fibre has a specific bent position, xi) correlating the bend attenuation and the mode field diameter to the cut-off wavelength by repeating steps vii) and viii) for various optical fibres characteristic of the produced fibre distribution.

DETAILED DESCRIPTION OF THE INVENTION

The present invention is based on the observation that the attenuation of the higher-order modes as a function of the wavelength, which is the basis for the present cut-off wavelength measurement, takes place practically identically to the attenuation of the fundamental mode as a function of the wavelength, albeit with a certain wavelength shift. The value of said latter wavelength shift is mainly determined by the type of refractive index change of the core of the single mode fibre and by the value of the mode field diameter. A consequence of this is that the measurement can now take place in the wavelength region that exhibits a good guidance of the fundamental mode, resulting in a much more stable measurement with a strongly decreased dependence on the exact fibre position.

The fundamental principles of the present invention are based on the measurement of the attenuation of the fundamental mode at one or more wavelengths in the operational wavelength region of the glass fibre that has has been deformed in a previously defined bending device, and subsequently relating the measured attenuation to the cut-off wavelength by means of a relation previously determined from a large population of glass fibres. If the attenuation measurement is only carried out with a limited number of wavelengths, a much simpler, so-called backscatter measurement may be carried out. The equipment to be used for this purpose is also used for numerous other applications in the fibre production, so that the invention also leads to a considerable saving in costs. Consequently, the method according to the present invention is characterized in that only one measurement at one wavelength suffices for determining the cut-off wavelength.

Thus, said specific wavelength preferably lies outside the wavelength region around the cut-off wavelength.

The setup that is usual for the standardised method of measuring the cut-off wavelength is also used in the embodiment of the present invention. In the standardised method of measuring, two spectral measurements are carried out, viz.:

a first measurement, in which no mode filter is used, but in which the signal having a varying wavelength is directly transmitted to the detector through the fibre to be measured. The fibre to be measured has a prescribed position in this case, for example a constant curvature with a radius of 14 cm;

a second measurement, in which the higher order modes are attenuated by a mode filter. The latter is a degree of bending of the fibre as defined in the relevant standard, as a result of which the fundamental mode is hardly attenuated in the wavelength region around the cut-off wavelength, in contrast to the higher modes.

A graph is derived from the difference between the two measuring curves, from which graph the cut-off wavelength can be determined in the manner as indicated in the relevant standards.

The result strongly depends on the exact fibre position, since the attenuation of the higher order modes in the wavelength region around the cut-off wavelength is strongly influenced by any form of bending.

The bend attenuation of the fundamental mode of a single mode fibre is to a very high degree determined by the "MAC"-value of the fibre, that is, the quotient of the mode field diameter (defined at a fixed wavelength, generally 1550 nm) and the cut-off wavelength. By measuring the bend losses for the defined form of bending, using the method according to the present invention, the cut-off wavelength can be determined if the mode field diameter is known.

In preparation, the measured attenuation A (in dB) at a fixed wavelength (e.g. 1625 nm) and for the defined form of bending is graphically plotted in advance for a large number of different fibres, which are jointly characteristic of the produced fibre distribution, against the MAC-value of each of the fibres. After approximation of the correlation thus measured by a regression curve, the following bend attenuation vs cut-off wavelength relation is obtained:

$$\log A = C_1 + (C_2)*(MAC) \quad (1)$$

from which the constants $C_1$ and $C_2$ can be determined.

In this first embodiment, the same setup is used for the present cut-off wavelength measurement as in the standardized method. The only difference is that in this embodiment measuring does not take place in the wavelength region around the cut-off wavelength, but at the same wavelength as the wavelength at which the constants $C_1$ and $C_2$ were determined. In this embodiment, too, two measurements are carried out, viz. one in which the bending device is used and one in which said device is not used. The mode filter remains activated with both measurements.

From the obtained measuring results, the attenuation B at 1625 nm is determined, after which the cut-off wavelength $\lambda_{co}$ is obtained from the formula:

$$\lambda_{co} = (C_2 \cdot w_0)/(\log B - C_1) \quad (2)$$

wherein $w_0$ is the value of the mode field diameter that was measured in advance. Since the measuring result is known obtained in the operational wavelength region, the result is now hardly dependent on the exact position of the fibre, which has a very positive effect on the accuracy.

Instead of the wavelength region of 1625 nm that is used in the first embodiment, also another wavelength may be selected, e.g. 1550 nm. In that case the values of the constants $C_1$ and $C_2$ will have to be determined anew, of course.

In a special embodiment of the present invention, the spectral measurement setup is preferably substituted for a backscatter apparatus.

In such an embodiment of the present invention, it is not the spectral measurement setup that is used for the attenuation measurement, using the bending device, but a backscatter measuring apparatus (OTDR). This is a sort of "radar" measurement, in which a short (in time) optical pulse is coupled into the fibre. An optical signal is emitted in all directions at any position in the fibre as a result of Rayleigh scattering. Some of the signals travel in the direction of the transmitter and are intercepted by means of a directional coupler and a sensitive detector. In this way a varying (in time) signal is obtained, from which a great many characteristics of the fibre can be derived. Thus, the measured curve, plotted on a logarithmic scale, is absolutely linear in the case of a fibre that is absolutely homogeneous, seen in axial direction. In this connection the slope of the curve is a measure of the attenuation of the glass fibre. In the case of a local attenuation in the fibre, for example in the form of a sudden twist in the fibre, a leap in the curve may result, from which the induced attenuation can be determined. The fibre to be measured is now coupled, using a fibre-to-fibre coupling, to a so-called "launch fibre", which is connected to the backscatter apparatus and which is used for all the fibres to be measured.

According to the second embodiment of the present invention, two measurements are carried out, viz. one in which the defined bending device is used and one in which said device is not used. The bend attenuation can be determined from the difference, after which the cut-off wavelength can be determined in the same manner as in the first embodiment.

The wavelength at which the measurement is carried out is determined by the wavelength of the laser that is incorporated in the backscatter apparatus. Said wavelength may e.g. be 1625 nm, but also e.g. 1550 nm. Furthermore, several switchable units may be incorporated in the backscatter apparatus, each unit comprising a laser using a different wavelength.

To prevent influencing of the coupling with the launch fibre upon introduction of the local bend losses, the introduction of a bend must take place at a point spaced by a certain fibre distance L from the location of the coupling. Said distance L may vary from a few meters to several kilometers. In the former situation, the two attenuation leaps in the measured backscatter curve are combined as a result of the limited resolution of the backscatter apparatus. If the distance L is several kilometers, for example when the attenuation is introduced at the other end of the fibre to be measured, this has the additional advantage that there will no longer be any perturbation of the reflection peak in the received backscatter signal as a result of the reflection at the connection between the launch fibre and the fibre to be measured.

Special embodiments of the present method are defined in the appended claims.

Various embodiments of the bending device that is used in the embodiments as described above are possible, in which connection it is important to note, however, that the value of the measured bending losses lies within the "dynamic range" of the measuring apparatus being used, and that the introduced bend is stable and reproducible.

A special form of bending is one in which the deformation of the fibre axis at the bend is identical to the deformation as used in the mode filter. By way of example, a device may be used wherein a number of small twists are introduced into the fibre by placing the fibre between two rows of round pins and moving said rows towards each other over a fixed, defined distance, thus producing a certain serpentine in the fibre axis.

This manner of bending makes it possible to carry out the present method of determining the cut-off wavelength in the same measurement setup, using the same operations, as used in the standardised method of measuring. As a result, the relation between the bend losses and the cut-off wavelength, characterized by the value of the parameters $C_1$ and $C_2$ can be determined in a simple manner, using an adapted refractive index profile, for example during the run up of a production process.

The present invention furthermore relates to a device for determining the cut-off wavelength of the optical fibre as defined in the appended claims.

The invention claimed is:

1. A method for determining a cut-off wavelength of an optical fibre, the method comprising:
   i) providing a spectral measurement setup,
   ii) carrying out a spectral measurement on the optical fibre using the spectral measurement setup at a specific wavelength,
   iii) bending the optical fibre,
   iv) carrying out a spectral measurement on the bent optical fibre, using the spectral measurement setup, at the specific wavelength,
   v) determining a bend attenuation on a basis of measuring results obtained in steps ii) and iv), and
   vi) determining a cut-off wavelength of the optical fibre based on the bend attenuation and a mode field diameter of the optical fibre by correlating the cut-off wavelength of the optical fibre to the bend attenuation and the mode field diameter of the optical fibre on the basis of a previously determined correlation between bend attenuation and cut-off wavelength.

2. A method according to claim 1, wherein said correlation is determined by:
   vii) determining a mode field diameter of a plurality of optical fibres,
   viii) measuring an attenuation of the plurality of optical fibres at said specific wavelength,
   ix) bending the plurality of optical fibres, measuring the attenuation of the plurality of bent optical fibres at said specific wavelength, and determining a bend attenuation,
   x) determining the cut-off wavelength of the plurality of optical fibres by carrying out a spectral attenuation measurement at a number of wavelengths around the cut-off wavelength, in which the optical fibre has a specific bent position, and
   xi) correlating the bend attenuation and a mode field diameter of the plurality of optical fibres to the cut-off wavelength for the plurality of optical fibres.

3. A method according to claim 2, wherein said specific wavelength lies outside the wavelength region around the cut-off wavelength.

4. A method according to claim 1, wherein the spectral measurement setup is a backscatter apparatus.

5. A method according to claim 4, wherein the bending iii) takes place at a point spaced by a distance L from the position where the optical fibre to be measured is connected with a fibre present in the backscatter apparatus.

6. A method according to any one of the preceding claims, wherein the bending of the optical fibre is carried out in a manner that the deformation of the fibre axis at the bend corresponds to the deformation of the fibre.

7. A device for determining the cut-off wavelength of an optical fibre, comprising:
   means for bending an optical fibre,
   a spectral measurement setup suitable for carrying out a spectral measurement on an optical fibre, said spectral measurement setup configured to carry out a spectral measurement on the optical fibre at a specific wavelength and to carry out a spectral measurement on the optical fibre after the optical fibre is bent by the means for bending at the specific wavelength, wherein bend attenuation is measured by said measurement setup from spectral measurements made prior to and after the bending of the optical fiber being carried out, and means for relating the cut-off wavelength to the bend attenuation and a mode field diameter of the optical fibre.

8. A device for introducing a bend into an optical fibre as used in the device according to claim 7, comprising:

means for introducing at least one bend into an optical fibre, means for guiding the optical fibre between at least two rows of vertical pins, and means for moving said rows of vertical pins towards each other so as to obtain a defined bend in the optical fibre.

* * * * *